United States Patent [19]
Biro et al.

[11] Patent Number: 5,769,530
[45] Date of Patent: Jun. 23, 1998

[54] COMPACT FLUORESCENT LAMP WITH EXTENDED LEGS FOR PROVIDING A COLD SPOT

[75] Inventors: Attila Biro, Kecskemet, Hungary; Erwin G. Steinbrenner, Parma Heights, Ohio

[73] Assignee: General Electric Company, Schenectady, N.Y.

[21] Appl. No.: 698,558

[22] Filed: Aug. 15, 1996

[51] Int. Cl.⁶ .................................................... F21V 29/00
[52] U.S. Cl. .......................... 362/216; 362/218; 362/294
[58] Field of Search .................................... 362/216, 218, 362/221, 225, 260, 294; 313/493, 634, 318.02

[56] References Cited

U.S. PATENT DOCUMENTS 4,503,360  3/1985  Bedel .................................. 362/373
4,737,895  4/1988  Silver .................................. 362/225

FOREIGN PATENT DOCUMENTS

207404  8/1990  Japan .................................. 362/216

Primary Examiner—Y. My Quach
Attorney, Agent, or Firm—George E. Hawranko

[57] ABSTRACT

A low pressure discharge lamp, particularly a compact fluorescent lamp, achieves substantially the same base-down lumen output as base-up lumen output. The lamp does so in a bent and bridged configuration, preferably in the shape of a plurality of vertically oriented bent tubes horizontally bridged together, where at least one of the tubes has at least one extended leg that defines a cold chamber within or adjacent the base.

16 Claims, 4 Drawing Sheets

COMPACT FLUORESCENT LAMP WITH EXTENDED LEGS FOR PROVIDING A COLD SPOT

This application is related to a commonly-owned and concurrently filed application entitled COMPACT FLUORESCENT LAMP HAVING A COLD SPOT IN AN EXHAUST TUBE which is hereby incorporated by reference.

FIELD OF THE INVENTION

This invention pertains to the art of discharge lamps and more particularly to low pressure discharge lamps. The invention is specifically applicable to compact fluorescent lamps having a bent tube configuration, preferably in the shape of a plurality of vertically-oriented bent tubes horizontally bridged together where at least one of the tubes is longer than the others for extending into the ballast so as to form a cold chamber, and will be described with reference thereto. However, it will be appreciated that the invention has broader applications and may be advantageously employed in environments and applications related to the preferred embodiments described below.

BACKGROUND OF THE INVENTION

In recent years, there has been a tremendous surge in the use of compact fluorescent lamps in place of conventional incandescent lamps. Consumers and commercial establishments are converting to compact fluorescent lamps because of the longer life and improved energy efficiency of the compact fluorescent lamp over that of the conventional incandescent lamp.

These compact fluorescent lamps are often one or more interconnected narrow fluorescent lamp tubes which are bent, coiled, or bent and bridged to fit into a compact volume. One example of a compact fluorescent lamp is shown and described in U.S. Pat. No. 4,503,360 issued to D. E. Bedel on Mar. 5, 1985. As generally described in that patent and as well known in the art, a typical compact fluorescent lamp forms a continuous lamp envelope or discharge tube by joining together a plurality of tube portions. The tube portions are usually oriented to extend outwardly a predetermined length from a base or housing.

For these fluorescent lamps to compare favorably to incandescent lamps, higher lumen output levels must be obtained so that a compact fluorescent lamp achieves substantially the same lumen output as the standard incandescent lamps it desires to replace. For example, the average light output for a one hundred (100) watt incandescent lamp is one thousand seven hundred (1700) lumens at one hundred (100) hours. A compact fluorescent lamp, in which the discharge tube has an inner diameter of ten (10) millimeters (mm) and an argon gas fill pressure of three to four (3–4) Torr operating at approximately twenty four (24) watts, will require an arc length of about 610 mm to achieve this same lumen output. Additional discharge tube length is further required to accommodate the electrodes and ends resulting in an overall discharge tube length of approximately 670 mm.

Lamp manufacturers have used multiple bent tubes connected at bridge portions as well as helically coiled and other shaped tubes in attempts to achieve extended discharge tube lengths as required for sufficient lumen output in a relatively compact area as required by current lamp and fixture constraints. However, these designs are insufficient due to the ballast assembly. Specifically, the ballast assembly is a required element that provides the electrical potential for exciting the gas fill to a discharge state, but the ballast assembly also adds to the overall lamp length, resulting in a compact fluorescent lamp assembly that fails to fit within the area defined by the harps of commercially available table lamps that accommodate a 100 watt or 150 watt incandescent lamp.

Although continued development in the ballast assemblies has resulted in reduced size, these more compact designs still fail to adequately address various heat transfer considerations. The heated electrodes in the discharge tube can damage a plastic housing used to support the compact fluorescent lamp. Additionally, the electrodes are the primary source of heat transmitted to the ballast electronic components.

One proposed solution to these heat transfer concerns is to raise the height of the electrodes in compact fluorescent lamps having vertically extending legs. This positions the electrodes further from the housing and the ballast assembly so that the effect of elevated temperatures is counteracted. Unfortunately, this solution adds to the overall height of the lamp because of the minimum arc between electrodes length required to produce sufficient lumen output as was described above. Since a primary goal of present designers is to enhance acceptance and widespread use of the compact fluorescent lamp by reducing the height of the lamp assembly, this solution to the heat transfer problems merely complicates the objective of reduced height of the lamp assembly.

Other solutions to manufacturing a more compact fluorescent arc tube that still dissipates a consumer acceptable wattage level have been proposed. These proposals, though, have their attendant disadvantages. For example, the length of the discharge tube can be reduced by operating the lamp at a higher current. Because of the negative volt-ampere characteristics of the discharge, increasingly large currents are required for increasing lamp wattage. On the other hand, electrode losses increase in direct proportion to the current. Therefore, lamps operating at higher currents suffer a higher percentage of electrode and wall losses. In addition, increasing the current increases wall loading which leads to higher envelope wall temperatures. This, in turn, makes it more difficult to achieve an optimum cold spot temperature for mercury vapor pressure control. Optimum light output then requires the use of a high temperature amalgam. Still further, higher current levels result in more power being dissipated by ballast resistors and induction coils thereby increasing plastic and electronic component temperatures and lowering the efficiency of the ballast.

Generally, in compact fluorescent lamps the tube diameter is 0.5 inches or less which is smaller than in linear fluorescent lamps. This narrow tube diameter when combined with relatively high current of typically 0.15 A to 0.3 A, as is needed to supply sufficient lamp wattage to make compact fluorescent lamps equivalent to conventional incandescent lamps, results in more heat imparted to the bulb walls than occurs in conventional incandescent lamps. This heat is from conduction of discharge losses and UV conversion by the phosphor. Also contributing to the heating of the walls is the close proximity of other segments of the tubing. This heating results in an average wall temperature in compact fluorescent lamps of typically 70°–100° C.

However, for maximum light output from the lamp and maximum light efficiency, the average wall temperature of a compact fluorescent lamp should be much lower; more particularly, the temperature should preferentially be between approximately 42°–50° C. This operation of compact fluorescent lamps at much higher than optimal temperatures results in significantly reduced light distribution. For instance, if the wall temperature is 30° C. above this optimal temperature range as is typical in standard compact fluorescent lamps, the efficiency and resulting visible light distribution will be reduced by approximately 20%. Since the compact fluorescent lamp is competing with standard incandescent bulbs, this significant light distribution reduction makes the compact fluorescent lamp far less desirable.

Figure 1:
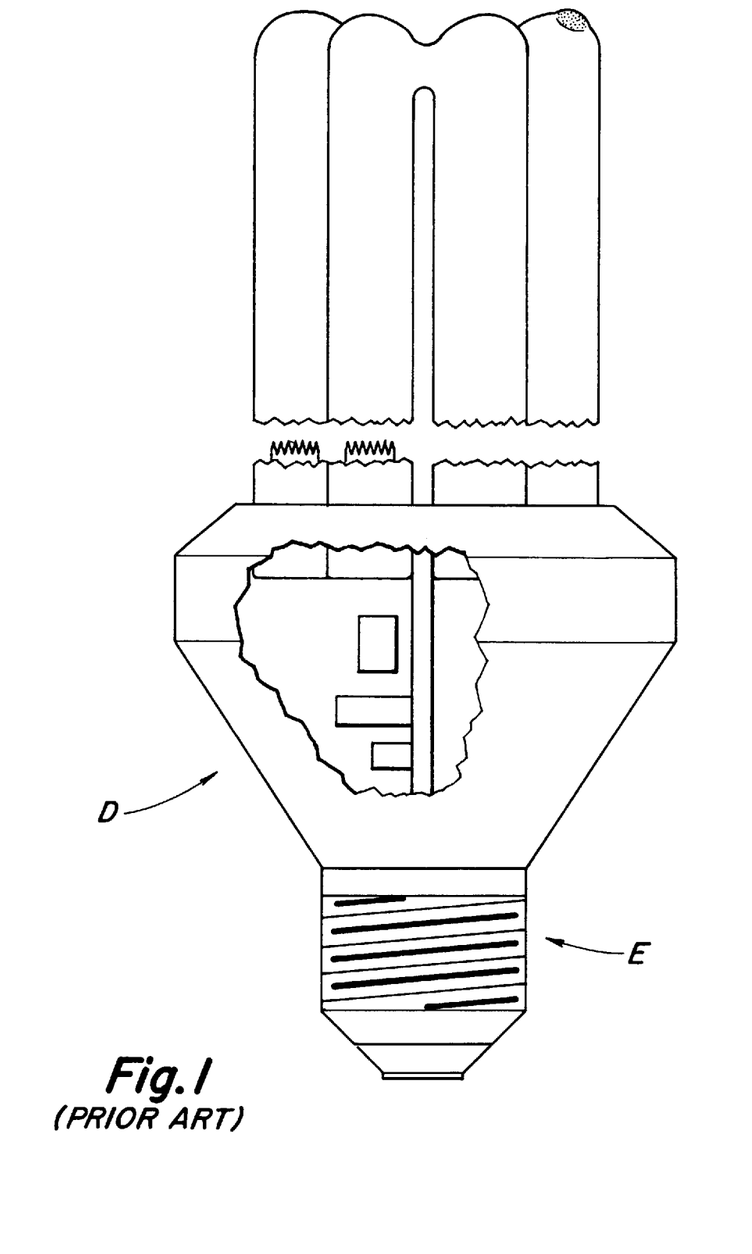
FIG. 1 is an elevational view of the prior art "cold spot" design with a portion of the ballast housing removed.

In response to the need to increase the current to supply sufficient lamp wattage, while maintaining a lower wall temperature to allow the necessary additional light distribution to make the compact fluorescent lamp competitive with standard incandescent bulbs, "cold spots" have been used in compact fluorescent lamps since the early 1980's as shown in FIG. 1. These cold spots offset the rise in temperature caused by the higher current by supplying a selected area within the envelope that functions at a cooler temperature than the remainder of the tubes thereby supplying surface area where mercury can condense.

Two commonly used "cold spot" designs have been used both of which modify the envelope geometry to create wall regions away from the discharge and away from the hot electrodes where the mercury can condense. Typically, the cold spot is often an aberration in the lamp wall such as a corner, protrusion, or dent that is located opposite the electrodes in the envelope. Specifically, one "cold spot" design involves the tubes extending above the glass bridge that connects adjacent tubes where the discharge passes through the legs of the tubes and through the bridge below the tips defined by this extension. A second "cold spot" design uses corners of a bent tube that are "blown" out so that the corners are further away from the discharge. In either design, these cold spots offers a more suitable area in which the mercury in the lamp can condense.

The result is that in these compact fluorescent lamps the cold spots are provided in one end portion of the lamp on the wall away from the discharge and the hot electrodes which are located in the other end portion of the lamp adjacent the ballast housing. This configuration decreases the average wall temperature in the cold spot area to allow for higher light output in the cold spot area.

However, this solution has at least one significant drawback. This solution only works when the lamp is in a base-up position, i.e., where the base (the ballast housing and connection base, if used, such as an edison base) is above the lamp such that the lamp extends downward therefrom, an example of which is a lamp in the ceiling where the envelope extends downward out of the ceiling. The effectiveness of the compact fluorescent lamp in a base-up position with cold spots opposite the electrodes is based upon the scientific principle that heat rises. Specifically, the effectiveness of the compact fluorescent lamp in a base-up position with cold spots opposite the electrodes is a result of the ambient air via convection carrying away heat as it passes over the area of the lamp having the cold spot. Thereafter, the air then continues to rise toward the base.

In contrast, when the lamp is flipped to a base-down position, i.e., where the base is below the lamp such that the lamp extends upward therefrom (such as in a table lamp for instance), the lamp becomes ineffective due to an inability to keep at least some of the tube wall at a cool enough temperature to allow for maximum lumen output. Specifically, the ambient air via convection picks up heat as it passes the lower base with the heat generating electrodes therein and then rises. As the heated air rises it passes over the area of the lamp having the cold spot. The heated ambient air is too warm to receive heat from the cold spot, and instead actually warms this area. The lack of cooling, and in some cases heating, of the cold spot is not preferred since it results in an approximately 20% reduction in lumen output.

Therefore, the need to dissipate heat by natural convection from the bulb or envelope wall leads to a temperature distribution along the wall which is a sensitive function of the orientation of the lamp and the geometry of the enclosing fixture. As a result as described above, not only do compact fluorescent lamps often operate below potential or peak lumen output, but the performance of compact fluorescent lamps is also adversely effected by the different orientations, different sockets, and different enclosures.

This problem is magnified by the recent energy regulations requiring that new compact fluorescent lamps have a base-down lumen output that is within ninety-five percent (95%) of the base-up lumen output.

Generally, significantly improved thermal characteristics are required to satisfy the new regulations as well as the consumer's demand that fluorescent lamps emit comparable lumen outputs to incandescent lamps. In addition, these fluorescent lamps must be compact enough to fit within the same space constraints as the standard incandescent lamps.

One such attempt to design a compact lamp that satisfied at least some of the above problems included a rippled copper strip placed in the base of the lamp to provide both thermal contact with the base and a cold spot at the end of one of the exhaust tubes when the lamp is operated in a base-up configuration. The justification for such a design was the belief that in this configuration the mercury droplets have a tendency to fall from the top of the lamp whereby each droplet would be cooled by the copper strip. Research and testing have resulted in conclusions that the strip is not effective, possibly because of a lack of good thermal contact between the strip and the tube. Additionally, the strip makes contact also with the top of the base which is heated by the discharge, the nearby electrodes, and the ballast thereby counter-productively adding heat. In this design, the temperature near the base of the lamp remains too hot to serve as a cold spot.

SUMMARY OF THE INVENTION

Accordingly, it is a principal object of this invention to provide a compact fluorescent lamp with cold spots or areas positioned such that the lamp configuration (whether base-up, base-down, or somewhere in between), and the fixture type do not significantly effect lumen output.

It is another object of the present invention to provide a compact fluorescent lamp to replace standard incandescent lamps and fit in the same sockets that the edison-based incandescent lamps fit in while not interfering with the shades and harps that cover said lamp.

It is yet another object of the present invention to provide a compact fluorescent lamp of reduced size but controllable temperature.

It is still another object of the present invention to provide a compact fluorescent lamp having a base down lumen output that is within ninety-five percent (95%) of the base up lumen output as desired.

In addition, it is a further object of the present invention to provide a compact fluorescent lamp that has improved thermal characteristics resulting in a reduction in the temperature of the lamp wall at the base of the assembly where the heat generating electrodes and thus an increase in overall lumen output.

These objectives are met by the present invention which is a compact fluorescent lamp having an envelope formed in a bent and bridged configuration and containing a gas fill energizeable to a discharge state. Specifically, a fluorescent lamp operable in a base-down and a base-up configuration with at least two tubes is provided. Each tube has a first leg with a closed end and adapted to rise from a base, and a second leg with a closed end adapted to descend toward a base where the first and second legs are attached at a bend. Some of the legs include electrodes extending through the closed ends to the exterior of the tubes for providing for connection through a base to a power source. A bridging section connects the second legs to define a continuous conduit for ionized gases between the electrodes. A cold chamber provides a lower extension descending from at least one of the second legs or the bridging sections.

Still other objectives, advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

DETAILED DESCRIPTION OF THE PREFERRED EMBODIMENTS

Figure 2:
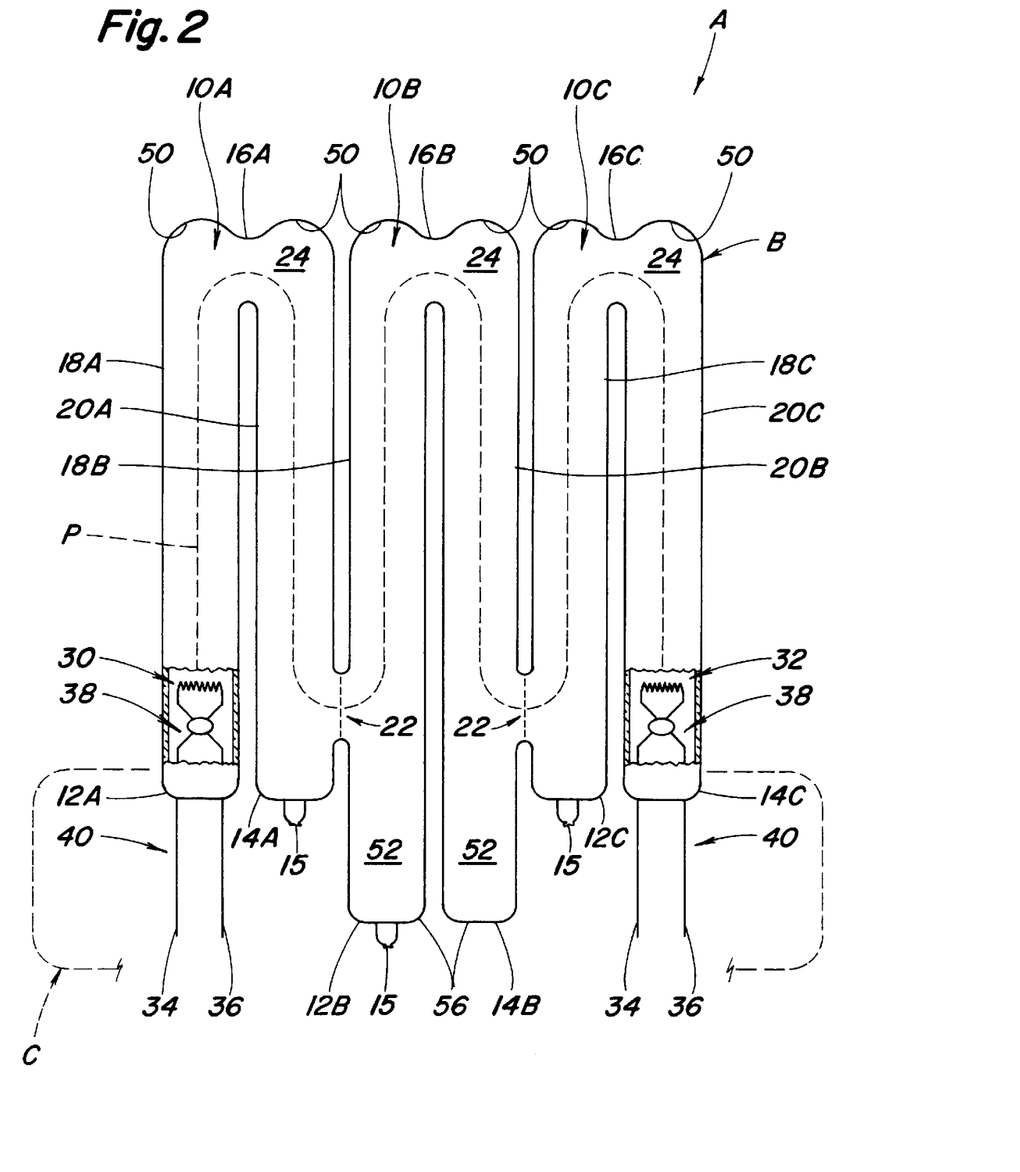
FIG. 2 is an elevational view of a preferred compact fluorescent lamp formed in accordance with the subject invention where one of the tubes is extended into the base (the view being such that several legs of the lamp tube are spread apart in a planar embodiment for ease of illustration)

Referring now to the drawings wherein the showings are for the purposes of illustrating the preferred embodiments of the invention only and not for purposes of limiting same, the FIGS. 2–7 show the preferred embodiment of a low pressure discharge lamp assembly A, particularly, a compact fluorescent lamp assembly, having an envelope B and a base C typically including a ballast housing D and a connection base E such as an edison base as used in threaded incandescent sockets or a pin base as used in fluorescent lamps. Specifically, the preferred embodiment of the present invention is shown in FIG. 2 while FIGS. 3–7 show some of the geometrical configurations of tubes applicable to the embodiment.

In the embodiment shown in FIG. 2, the envelope B is of a bent and bridged design configuration. The envelope has several legs that are spread apart in a planar format for ease of illustration. In practice, the envelope may be planar as shown, or preferentially instead, of some three dimensional configuration as is discussed in more detail below and shown in the additional FIGS. 3–7.

The envelope B, as illustrated in FIG. 2, is defined to include three elongated bent tubes, namely 10A, 10B, and 10C, bridged together as is described in more detail below, although the envelope may alternatively include additional or fewer tubes depending upon its design and geometric configurations, and the spacial constraints of the lamp, as are explained in further detail below.

In the illustrated three tube embodiment, elongated tubes 10A and 10C are identical, while tube 10B is similar yet longer, and therefore, the description in the remainder of this paragraph is applicable to all of the tubes. Each tube is cylindrical and of a constant diameter except for the contour of its bend. Each tube has a pair of ends, specifically first and second ends 12A and 14A in the first tube 10A, first and second ends 12B and 14B in the second tube 10B, and first and second ends 12C and 14C in the last, in this case third, tube 10C. Typically, at least one of the ends has an exhaust or evacuation stump 15 extending therefrom that remains from the tube manufacturing process.

In the bent and bridge embodiment as is shown in FIG. 2, each of the elongated tubes has a bend therein (preferably of 180°) about its mid-section. Specifically, bend 16A is in the first tube 10A, bend 16B is in the second tube 10B, and bend 16C is in the last tube 10C. These bends in each tube define a pair of relatively straight, long sections 18A and 20A, 18B and 20B, and 18C and 20C, respectively, with bends 16A–16C, respectively, therebetween.

Each of the tubes is fluidly connected to another of the tubes at bridges 22, specifically, each tube has a through connection to an adjacent tube. This defines envelope B as the combination of the tubes 10A–10C made up of long sections 18A–18C and 20A–20C with bends 16A–16C therebetween in unison with the bridges 22 interconnecting the tubes. Basically, the envelope B is one closed chamber 24 extending through all of the plurality of tubes 10A–10C with all of the legs substantially parallel.

Figure 3:
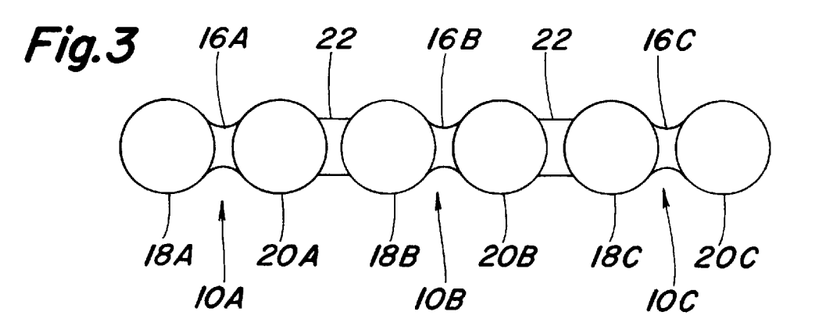
FIG. 3 is a sectional view of a planar embodiment of elongated tubes arranged along a line.
Figure 4:
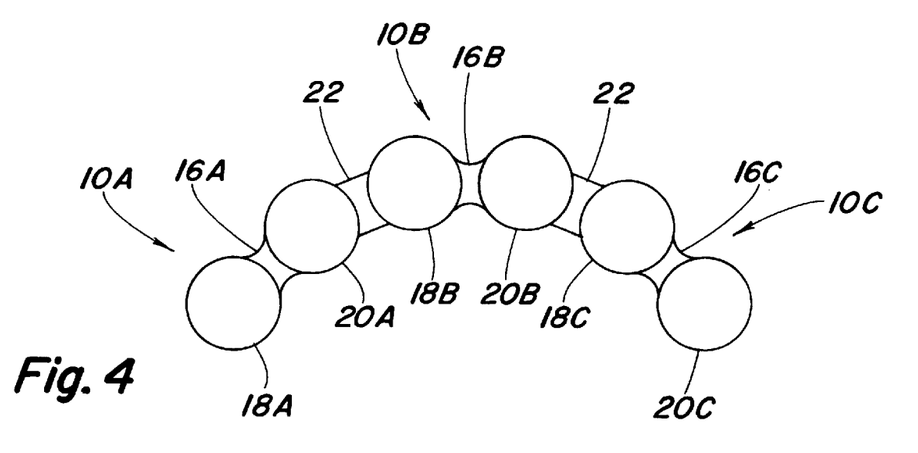
FIG. 4 is a sectional view of a curved embodiment of elongated tubes arranged along a curve.

The envelope, particularly one of bent and bridged construction, may be geometrically configured in a variety of ways including in a planar fashion as is shown in FIG. 2 (and from above in FIG. 3), where the plurality of elongated tubes 10A–10C are aligned in a plane. Alternatively, the envelope may be configured in other fashions that are of less total volume such as in a curved fashion as shown in FIG. 4, where the plurality of elongated tubes 10A–10C are arranged along a curve. All of these embodiments as shown in FIGS. 2–4 could include more or less than three tubes.

Figure 5:
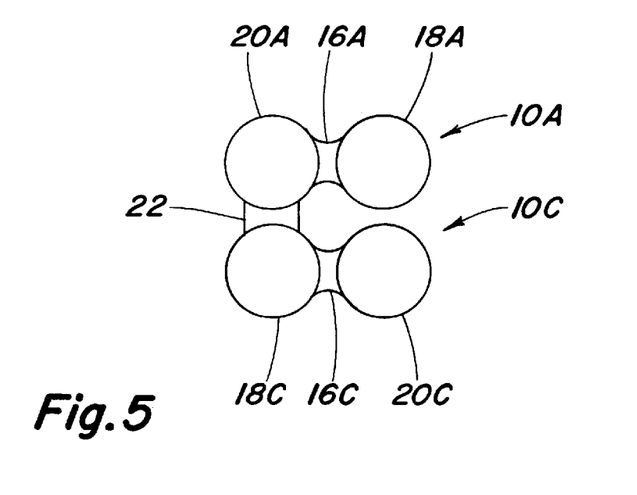
FIG. 5 is a sectional view of a second preferred construction of the compact fluorescent lamp shown with two tubes having four total legs in the SQUAREÏ format.
Figure 6:
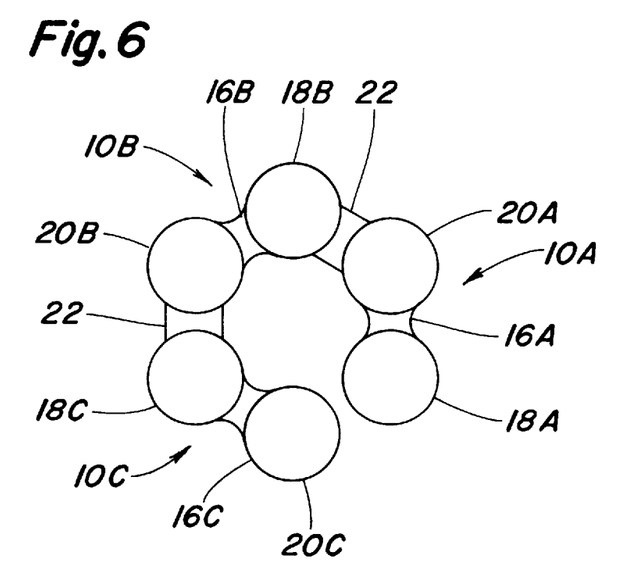
FIG. 6 is a sectional view of a preferred construction of the compact fluorescent lamp shown with three tubes having six total legs in the HEXÏ format; and, FIG. 7 is a sectional view of a third preferred construction of the compact fluorescent lamp shown with four tubes having eight total legs in the OCT™ format.
Figure 7:
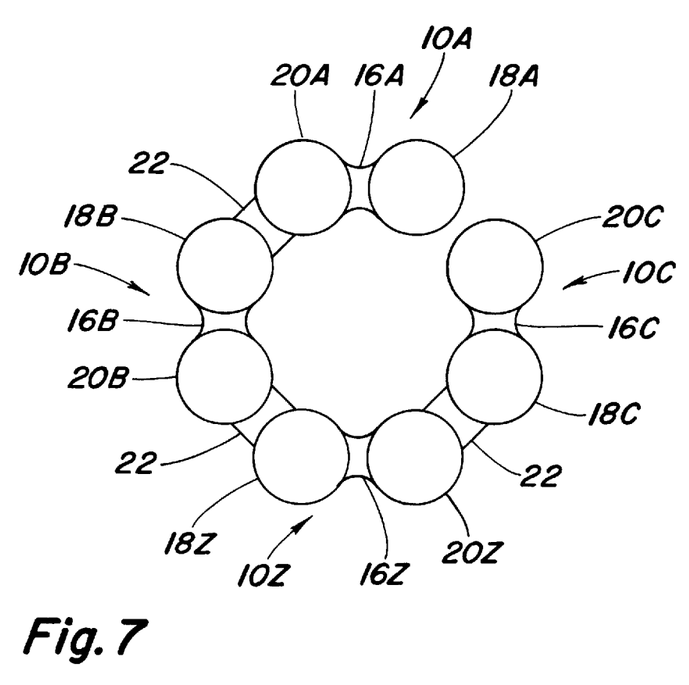

In addition, it is preferential for the envelope to be geometrically configured in any of a number of polyhedrical fashions with any number of tubes. The preferred polyhedrical shapes include a square or other shape comprising two tubes as shown in FIG. 5 and referred to by General Electric as a SQUAREÏ lamp, an approximately triangular or hexagonal shape with three tubes as shown in FIG. 6 and referred to by General Electric as a HEXÏ lamp, and an approximately octagonal shape with four tubes as shown in FIG. 7 and referred to by General Electric as an OCTÏ lamp. Other polyhedrical shapes such as rectangular, parallelogramatic, "S"-curve shaped, or others are contemplated where each of two, three, four, etc., tubes, each preferably with a bend therein as described below are used in the specified geometric manner. In some instances the plurality of tubes are arranged around a central axis to form this geometric shape, while others have no such symmetry. Due to space constraints within standard light fixtures, the polyhedrical arrangements may provide more efficient use of the limited space in which the bulb must fit with the highest lumen output. Similarly, the location of the bridges and electrodes may vary depending upon space and other constraints.

As is generally known in the art, the envelope is sealed from the external environment and contains a gas fill which is energized to a discharge state by applying and maintaining an electrical potential from a power source. Free electrons from the electrodes are accelerated by the potential difference and the kinetic energy of the electrons is transformed into internal energy of atoms in the gas fill upon collision with the free electrons. As the atoms relax to a lower energy state, internal energy of the atoms is dissipated as radiation.

Typically, the gas fill includes mercury and a noble gas, such as argon, sealed in a gas tight manner in the discharge tube. Electrode assemblies 30 and 32 are provided in at least some of the closed ends 12 and 14 of at least some of the discharge tubes (preferentially, electrodes 30 and 32 are provided in opposing closed ends of the entire envelope such that the longest possible arc length is provided). Preferably, the electrodes are provided in the terminal ends of the envelope which in the illustrative case would be ends 12A and 14C.

Electrical leads 34 and 36 extend outwardly from each of the respective closed ends having electrode assemblies therein. The leads 34 and 36 each having an inner portion 38 disposed within the sealed tube and an outer portion, or contact pin 40, external of the sealed tube for connection with the power circuit. Suitable connections are made to the contact pins from a ballast or driving circuit in base C, details of which are known in the art.

In the preferred embodiment, a phosphor coating is provided on the internal wall of the tubes. The coating converts ultraviolet radiation from the mercury additive excited in the argon fill gas into visible light. Again, particular details of the coating are well known in the art so that further discussion herein is deemed unnecessary to a full and complete understanding of the present invention.

In response to the need for a compact fluorescent lamp that provides the same lumen output levels as conventional incandescent lamps of standard wattages, e.g. 75 W, 100 W, 150 W, and 250 W, while providing the additional benefits of fluorescent light including longer life and improved energy efficiency, cold spots 50 are provided. These cold spots 50 are surface areas within envelope B configured to provide an area within the envelope conducive to maintaining a lesser temperature.

These cold spots 50, according to prior art teaching, are at the top of at least some, and typically all, of the tubes and are sufficiently positioned away from the electrodes generally located in the base C. These cold spots 50, which are in the form of an aberration in the lamp wall such as a corner, protrusion, or dent, offset the rise in temperature caused by the higher current by supplying an area conducive to better cooling than the remainder of the tubes. Generally this is accomplished by providing additional external surface area as is present in a corner, protrusion, dent, outward projections, or other aberration. This added cooling area allows the mercury in the lamp to condense on the tube walls, which results in better convection and thus more cooling than is present elsewhere in the envelope B where the gases are in vapor form.

However, compact fluorescent lamps with cold spots in the tops of the tubes opposite the heat generating electrodes are only effective when the lamp is in a base-up position, i.e., where the base is above the lamp such that the lamp extends downward therefrom. When positioned otherwise which is rather common, such as in a base-down position or at a position skewed somewhere between a base-up and a base-down position, the ambient air via convection often cannot properly carry away heat.

With only the use of standard cold spots 50, when the lamp is in a base-down position, i.e., where the base is below the lamp such that the lamp extends upward therefrom, the lamp becomes ineffective due to an inability to keep at least some of the tube wall at a cool enough temperature to allow "mercury drop" for maximum lumen output. As previously explained, the ambient air via convection picks up heat as it passes the lower base with the heat generating electrodes therein and then rises. As the heated air rises it passes over the area of the lamp having the cold spot. The heated ambient air is too warm to receive heat from the cold spot, and instead actually warms this area. Thus, these standard cold spots are often ineffective when the lamp is in a base-down position.

In response to both the need to position lamps other than base-up and the requirement that new compact fluorescent lamps have a base-down lumen output that is within ninety-five percent (95%) of the base-up lumen output, at least one additional cold spot or area is added to the envelope B. Specifically, a cold chamber 52 is critically positioned both away from the heat generating electrodes and in or near base C of the low pressure discharge lamp assembly A.

One such position is in a different tube from the electrodes but relatively adjacent the electrodes rather than at the opposite end of the envelope from the electrodes. Optimally, this cold chamber position is not within the direct electrode path B extending within the envelope B from electrode 30 to electrode 32 and is instead in an extended portion beyond the bridge connecting tubes in a tube that does not contain an electrode. Most preferentially, this cold chamber 52 extends into base C and away from the highest heat area adjacent the electrodes, and more particularly this cold chamber extends at least into the ballast housing of the base and in some case through the ballast housing into the connection base.

An embodiment including one position for this cold chamber 52 is shown in FIG. 2 where three tubes 10A–10C that are bent and bridged together to form envelope B are present. The middle or second tube 10B is longer than the substantially identical first and last tubes, 10A and 10C. Each of the tubes 10A–10C has a bend 16A–16C, respectively, adjacent cold spots 50, which is substantially adjacent the other bends and in the same plane perpendicular to the longitudinal lengths of the tubes, namely long sections 18A–18C and 20A–20C, respectively.

The second leg of 20A of first tube 10A at approximately its second end 14A is connected via bridge 22 to one of the relatively straight, long sections 18B of the second tube 10B, while the first leg 18C of third tube 10C at approximately its first end 12C is connected via another bridge 22 to the other of the relatively straight, long sections 20B of the second tube 10B. The result is one continuous chamber of sufficient length to obtain the same lumen output as the incandescent lamp.

The second tube 10B does not contain any electrodes. The bridges 22 connecting the first and third tubes to the second tube do not bridge over to the second tube at approximately the first or second ends 12B or 14B of the second tube, but instead bridge between the ends 12B and 14B and the bend 16 thereby defining a dead-end portion 56 in each end of the second tube 10B. Cold chambers 52 are within these dead-end portions beyond the bridges 22 in the second tube 10B such that the cold chambers extend into the base C.

Specifically, the first and third tubes 10A and 10C extend solely away from the base C. In contrast, the second tube 10B, with the dead-end portions 56 therein, extends both away from the base C in the same manner as the other tubes as well as extending inward into the base C. The result is that envelope B extends to both sides of the plane defined between the electrodes 30 and 32 and that is perpendicular to the elongated tubes defining the envelope.

Overall, this unique positioning of the cold chambers 52 allows the cold chambers to properly function during base-down positioning of the lamp because it is positioned below the electrodes and thus any convection flow that occurs involves ambient air which has not yet passed the heat generating electrode areas, which are above cold chambers 52.

In the preferred embodiment, the envelope B includes only cold chamber 52, the enveloped B includes both cold chamber 52 and cold spots 50 particularly where the only use for the particular lamp is a base-down use, although this unique cold chamber is isolated in the base sufficiently to allow the needed mercury drop even in a base-down position.

Where the envelope B includes both cold chamber 52 and cold spots 50 as shown in FIG. 1, a cold area is supplied for both base-up positioning, i.e., the cold spots 50, as well as the cold chamber 52, and base-down positioning, i.e., the cold chamber 52.

In the preferred embodiment of FIG. 2, the new cold chamber 52 is contained within the base C and thus well within at least the ballast housing if not a connection base such that the cold chamber is well removed from the electrodes, the discharge, the hot gases traveling between the electrodes, and the hot envelope walls. The result is the fixing of the temperature of the cold chamber by heat sinking to the ambient temperature in the ballast housing, and preferably to the ambient temperature of the ballast housing wall which is comparable to that of the outside ambient temperature. The cold chamber will be cooled toward this ambient temperature because the region is well away from the discharge, electrodes, phosphorous coating, etc., which are the heat producers of the lamp.

This cold chamber also eliminates the need to design and manufacture special corners or protrusions within the lamp walls, particular when the lamp will only be used in base-up position, although this novel cold chamber works efficiently enough to eliminate special corners and protrusions in all positions including base-down.

An additional benefit provided by the cold chamber within the ballast housing is that the ballast housing wall is not effected by convection currents rising along side the hot lamp tubes, and therefore the lamp burns with equal efficiency in any position including base-up or base-down.

The invention has been described with reference to the preferred embodiments. Obviously, modifications will occur to others upon a reading and understanding of this specification and this invention is intended to include same insofar as they come within the scope of the appended claims or the equivalents thereof.

What we claim as new and desire to secure by Letters Patent of the United States is:

1. A fluorescent lamp assembly operable in a base-down and a base-up configuration, comprising:
   at least two tubes, each tube having a first elongated section having a closed end and adapted to rise from a base, and a second elongated section adapted to descend toward the base;
   at least some of the elongated sections including electrodes extending through said closed ends to an exterior of said tubes providing for connection through the base to an associated power source;
   a bridging section connecting the second elongated sections to define a continuous conduit for allowing passage of ionized gases therethrough and between said electrodes; and,
   a cold chamber provided by a lower extension descending from at least one of a group of the second elongated section and the bridging section toward the base.

2. The fluorescent lamp assembly as set forth in claim 1 wherein each tube has a bend in between its closed end and an opposing end therein that defines the first and second elongated sections.

3. The fluorescent lamp assembly as set forth in claim 2 wherein the bend is at approximately a mid-section of each respective tube.

4. The fluorescent lamp assembly as set forth in claim 2 wherein the tube sections extend in generally parallel relation and the bridging section comprises a connection extending generally perpendicular between the second elongated sections.

5. The fluorescent lamp assembly as set forth in claim 1 wherein the bridging section comprises at least a third tube.

6. The fluorescent lamp assembly as set forth in claim 5 wherein the third tube comprises third and fourth elongated sections defined by a bend within the third tube.

7. The fluorescent lamp assembly as set forth in claim 6 wherein each of said third and fourth elongated sections are disposed in generally parallel relation and a connection extends generally perpendicular thereto for connecting with one of the second elongated section for further defining the continuous conduit.

8. The fluorescent lamp assembly as set forth in claim 6 wherein at least one of the third and fourth sections includes the lower extension.

9. The fluorescent lamp assembly operable in both base-down and base-up positions comprising:
   a first, second, and third tube, wherein each of the tubes has a first and second end with a bend therebetween defining a first and second elongated section, respectively,
   the first end of the first tube and the second end of the third tube each having an electrode therein;
   a first bridge connecting approximately the second end of the first tube to the first elongated section of the second tube;
   a second bridge connecting approximately the first end of the third tube to the second elongated section of the second tube; and
   a cold chamber extending from the bridge and spaced away from the ends in the first and second tubes opposite the bends.

10. The fluorescent lamp assembly as set forth in claim 9 wherein the first, second and third tubes define an envelope containing a gas fill that is energizeable to a discharge state.

11. The fluorescent lamp assembly as set forth in claim 9 wherein lumen output of the lamp assembly in the base-down position is within ninety-five percent of lumen output in the base-up position.

12. A fluorescent lamp assembly as set forth in claim 9 further comprising a base affixed to the first end of the first tube and the second end of the third tube.

13. The fluorescent lamp assembly as set forth in claim 12 wherein the cold chamber extends adjacent one of the first and second bridges and at least down into the base and operates only in the base-down position.

14. A fluorescent lamp assembly operable in a base-down and base-up configuration, comprising:

a base for connection to a power source and having two pairs of electrical leads;

a plurality of tubes bridged together to define a continuous envelope containing a gas fill that is energizeable to a discharge state and having a pair of electrodes positioned therein at opposing ends of the envelope and each electrode being connected to a pair of electrical leads; and at least one dead-end section extending into the base from one of the plurality of tubes and defining a cold chamber.

15. The fluorescent lamp assembly as set forth in claim 14 wherein each tube has a pair of opposing ends with a bend therebetween whereby the bend defines a first and second elongated leg.

16. The fluorescent lamp assembly as set forth in claim 15 wherein at least one of the elongated legs of one of the tubes is longer than the legs of the other tubes.

* * * * *